Jan. 3, 1967 A. NATHAN 3,296,428

ELECTRONIC FUNCTION GENERATOR

Filed Feb. 13, 1963 2 Sheets-Sheet 1

INVENTOR

Amos Nathan

FIG. 6
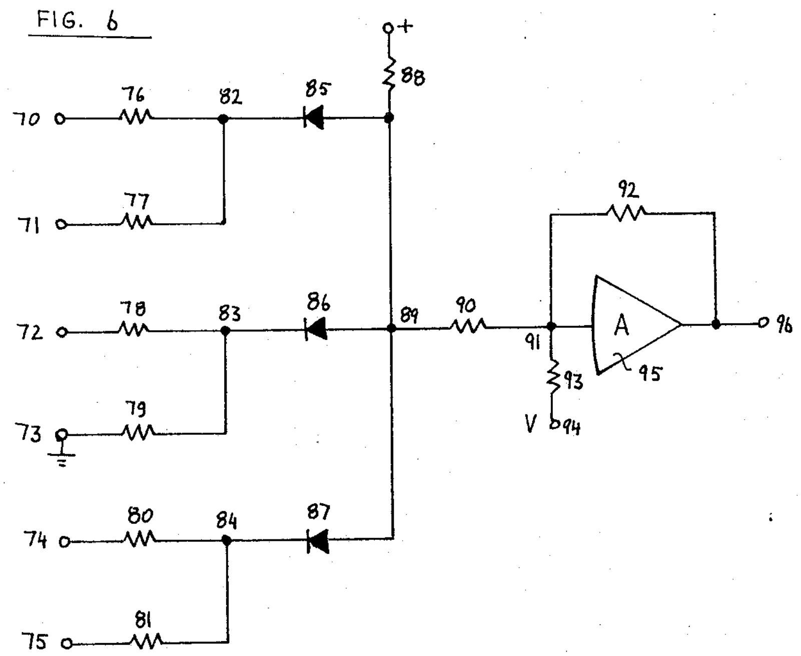
FIG. 7
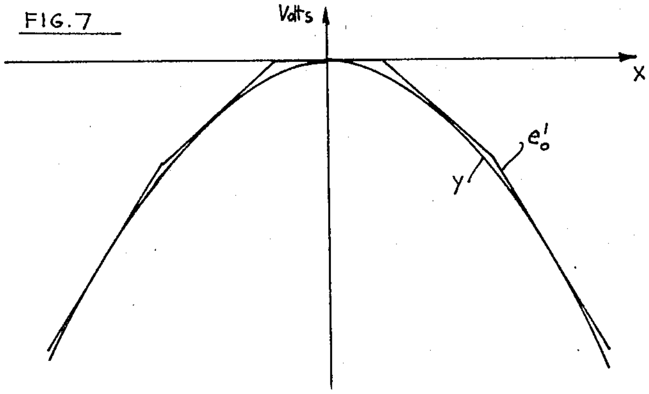
FIG. 8 FIG. 9
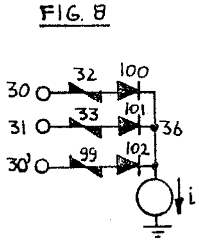
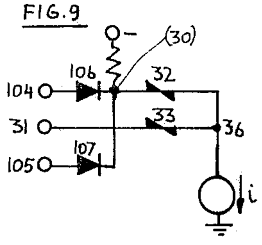
INVENTOR
Amos Nathan.

United States Patent Office 3,296,428

Patented Jan. 3, 1967

3,296,428

ELECTRONIC FUNCTION GENERATOR

Amos Nathan, Dept. El. Engineering, Technion, Israel Inst. Technology, Haifa, Israel Filed Feb. 13, 1963, Ser. No. 258,335
31 Claims. (Cl. 235—197)

This invention pertains to means for generating a function of one or more variables wherein the input variables and the value of the function are represented in the form of electric potentials. More specifically, this invention pertains to the case in which said means include a plurality of resistive interpolating means having a common output connection.

This specification is a continuation-in-part of my U.S. Patent No. 3,106,639, Electronic Function Generator with Interpolating Resistors, filed September 2, 1959 and patented October 3, 1963.

In the field of analog computers, for example, it is frequently required to generate a function of one or more variables such that the value of the function is obtained practically instantaneously. It is then often convenient to approximate such a function by a piecewise-linear approximation and to produce it with the aid of a plurality of diode selection means selecting one of a suitable plurality of input signals each of which is a linear function of said variables. Prior art function generators of this kind require a great number of diodes and associated circuits in order to obtain a function with a prescribed accuracy.

If a function is approximated by a piecewise-linear approximation, the errors of approximation are particularly pronounced at the transitions from one linear region to another, i.e. at the corners or edges of the curve or surface representing said approximation. It is therefore advantageous to round off said approximation and thus to provide an approximation which is better than the piecewise-linear approximation.

Some prior art function generators for the production of piecewise-linear functions use a plurality of diode means having a common output connection selecting one of a plurality of input signals as output signal. In such function generators the number of linear regions in the produced function is equal to the number of diodes used, because only one diode can be conductive at any given instant in such a circuit.

Other prior art function generators produce a plurality of first signals representing a corresponding plurality of functions each of which consists of two linear regions. Said linear regions are adjacent at a "break point." Said signals are subsequently linearly combined producing a piecewise-linear output signal having a number of break points equal to the number of said first signals. Production of each first signal is effected in the prior art in a circuit embodying resistive means and one diode. Thus, such a function generator requires $n$ diodes for the production of a function having $n$ breakpoints.

One prior art function generator of this type uses a plurality of branches each comprising a series combination of a diode and a linear resistor, having a common output connection at the input terminal of an operational amplifier which includes a suitable feedback resistor. The operational amplifier induces a "virtual ground" potential at said common connection and the current flowing in each of said branches is thereby made proportional to the potential received at the corresponding input terminals of the branches, or equal to zero, depending upon the relative polarity of said received potential and the diode in the corresponding branch. The current in different branches are independent of each other as well as independent of the current in any other branch connected to said common connection, since said connection is held at zero potential because of the virtual ground induced by said operational amplifier in conjunction with said feedback resistor.

Each branch corresponds in such a function generator to one of said first signals, the circuit being such that said first signals are linearly combined to produce a piecewise-linear output signal having one breakpoint per branch, the contributions of the respective branches to the formation of said output signal being independently adjustable because of the use of said operational amplifier.

Other prior art function generators use nonlinear resistors in order to improve the degree of approximation to a prescribed function which it is desired to produce. Such function generators rely on the voltage/current characteristic of a non-linear resistor, such that an input signal corresponds to said voltage and an output signal substantially corresponds to said current, or vice versa. Exclusive reliance on said characteristic has a major disadvantage in that such a characteristic cannot readily be produced to conform to different required functions, at the present state of the art. Any given function generator of this type can, moreover, not readily be adjusted to produce a number of substantially different functions.

Nonlinear resistors have also been used in combination. In particular, series and parallel combinations have been used. Any such prior art combination has the effect of adding up characteristics of different nonlinear resistors or of linearly combining a plurality of signals each nonlinearly produced in one non-linear resistive function generator.

Nonlinear resistors have also been used in conjunctions with circuits using diodes. In such circuits, said diodes produce from a primary input signal a secondary input signal which is a piecewise-linear function of said primary signal, said secondary input signal being used as input signal to a nonlinear resistive function generator. For example, two diodes having a common output connection and accepting a signal $x$ and a signal $-x$ respectively, can be adapted to produce at said connection a signal equal to the modulus of $x$. A nonlinear resistive function generator producing an output function corresponding to $x^2$ for nonnegative values of $x$ can thus be adapted to produce $x^2$ for negative and positive values of $x$ by feeding it with said modulus signal.

In any such prior art nonlinear function generator production of an output function is in accordance with one of the following methods:

(i) The current/voltage characteristic of a nonlinear resistor, or of a series or parallel combination of nonlinear resistors, in combination or not in combination with additional linear resistors, is substantially reproduced in the input/output characteristic of the function generator.

(ii) The inverse of such a characteristic is reproduced by insertion of the nonlinear device in the feedback path of an operational amplifier.

(iii) A linear combination of functions produced as in (i) and (ii) above is produced.

(iv) A cascade circuit is used, each stage of the cascade operating as in (i), (ii) or (iii) above.

(v) Any of the above methods is used in conjunction with additional generating means producing suitable input functions.

Any one of these prior art embodiments have the limitations recited above.

The prior art does not teach how to combine the beneficial results of both the prior art piecewise-linear function generator and the prior art generator using nonlinear resistors. Replacement of the linear resistors, or of the combinations of linear resistors and diodes, by nonlinear resistors does not yield the desired result.

This invention provides function generators comprising a plurality of input means, a plurality of resistive interpolating means connected thereto at least one of which being nonlinear and having a common output connection, current means connected to said output connection for supplying the current of at least one of said resistive means at any given instant, such that the current distribution in said resistive means depends upon the relative potentials of said input means and said function generator can assume states in which at least two of said interpolating means conduct current simultaneously, producing at said output connection a signal representing a prescribed function of a plurality of signals received by said input means.

The term nonlinear resistance is here used to denote any resistance whose value depends upon the current flowing through it, such as that of a series combination of a linear resistor and a diode or a voltage dependent resistor. The resistive component of an interpolating means will be called an interpolating resistance. The supplied current can be either positive or negative. A relative potential of two input means denotes the difference of their potentials.

It is an object of this invention to provide function generators in which an approximation function is produced comprising a plurality of linear regions greater in number that the number of nonlinear means employed.

It is another object of the invention to provide function generators producing a piecewise-linear or a nonlinear convex or concave function.

Still another object of the invention is the provision of nonlinear function generators including a plurality of nonlinear resistance means for the production of an output function such that said output function does not depend in a first approximation upon the exact nonlinear characteristic of said nonlinear means.

Yet another object of the invention is the provision of function generators having the transfer property, i.e. substantially transferring any signal simultaneously applied to all input terminals through the function generator to its output terminal.

Another object of the invention is the provision of squarers.

A yet further object of the invention is the adaptation of such squarers for the production of a signal representing the product of two variables.

Other objects and advantages of the invention will become apparent from the following description, taken in conjunction with the accompanying drawings in which FIGURE 1 is a schematic diagram of a function generator for the production of convex functions;

FIGURE 6 is a schematic diagram of another squarer of the invention;

FIGURE 7 is a plot of functions relating to the squarer of FIGURE 6.

FIGURES 8 and 9 relate to further squarers of the invention.

Figure 1:
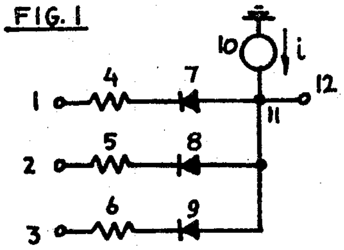

A prior art function generator will be described in connection with FIGURES 1 and 3. In FIGURE 1, 1, 2, 3 are input terminals receiving signals $e_1$, $e_2$, $e_3$ which are linear functions of variable $x$, as shown graphically in FIGURE 3. This prior art does not use resistors 4, 5, and 6. Diodes 7, 8, 9 are thus directly connected to terminals 1, 2, and 3, respectively. The diodes have a common output connection at terminal 11; in this example the anodes of said diodes are joined at terminal 11. Means is provided to supply current to terminal 11. In FIGURE 1 current is provided by current generator 10. Only one diode can conduct at any one instant and the output voltage produced at terminal 12 which is connected to terminal 11 is represented by the convex piecewise-linear curve PSQTR defined by the linear curves representing $e_1$, $e_2$, $e_3$. This prior art embodiment of a function generator produces an output signal corresponding to three linear regions. For this purpose three diodes are used.

The prior art provides similar circuits for the production of concave functions.

One embodiment of a function generator of this invention will be described in connection with FIGURE 1 which is a schematic diagram of a function generator which, if used as a generator of a function of one variable, can produce an output signal corresponding to five linear regions as plotted in FIGURE 3. Input terminals 1, 2, 3 receive input voltages $e_1$, $e_2$, $e_3$ which are plotted in FIGURE 3. Interpolating resistors 4, 5, 6 are connected to input terminals 1, 2, 3 and to diodes 7, 8, 9, respectively. Said diodes have a common output connection at their anodes, 11, positive current i being provided by current generator 10 is supplied to said common connection. Output terminal 12 is connected to said common connection.

Figure 3:
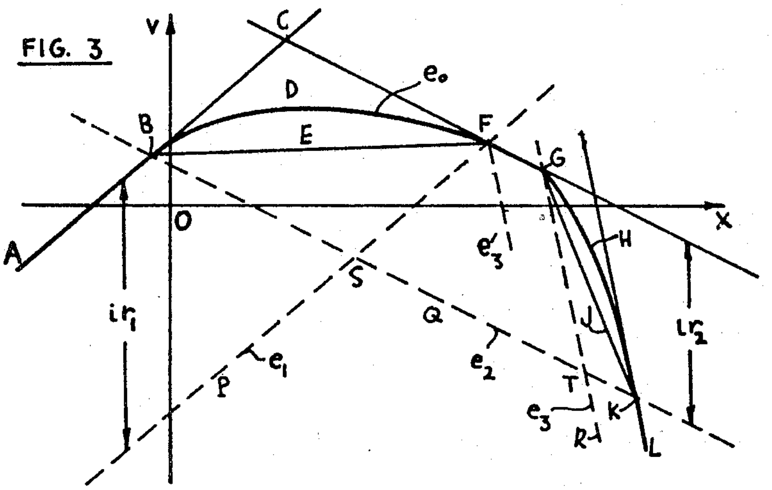
FIGURE 3 is a plot of input/output characteristics of function generators of this invention.

The operation of this function generator is best understood with reference to FIGURE 3. It was noted that PSQTR represents the output voltage at terminal 12 in the absence of interpolating resistors. In the presence of interpolating resistors, when only diode 7 conducts the output voltage will be higher than the voltage at terminal 1 by the voltage rise in resistor 4. If no current is withdrawn from terminal 12 this voltage rise is equal to $ir_1$, where $r_1$ is the resistance of resistor 4. Similarly, when only diode 8 conducts, there will be a voltage rise in resistor 5 of value $ir_2$ and when only diode 9 conducts there will be a voltage rise in resistor 6 of value $ir_3$, where $r_2$, $r_3$ denote the resistances of resistors 5, 6, respectively. The output voltage corresponds in these instances to AB, FG, KL, being $ir_1$, $ir_2$, $ir_3$ volts above $e_1$, $e_2$, $e_3$, respectively, as plotted in FIGURE 3.

The function generator of FIGURE 1 can, however, assume states in which two diodes conduct simultaneously. Thus, when diodes 7 and 8 conduct simultaneously whereas diode 9 does not conduct, the output voltage at terminal 12 is a linear function of $e_1$ and of $e_2$, provided that 4 and 5 are linear resistors. In FIGURE 3 the output voltage corresponding to this state is represented by BEF. Similarly, assuming linearity of resistor 6, GJK in FIGURE 3 corresponds to simultaneous conduction of diodes 8 and 9 and nonconduction of diode 7. The output voltage of the function generator of FIGURE 1 thus corresponds to the piecewise-linear curve ABEFGJKL which consists of five linear regions. This function generator thus produces a function which consists of five linear regions although only three diodes are used. The function generator comprises three input branches, each of which is nonlinear and resistive, the nonlinearity being provided in this example by diode means and the resistance being provided by linear resistance means.

In general, if there are $n$ input branches, it is thus possible to produce a piecewise linear function consisting of $2n-1$ linear regions provided that $n$ is greater than one.

Regions of the output curve such as BEF or GJK which correspond to simultaneous conduction of more than one branch of the function generator will be called interpolated regions. In order more fully to understand how these interpolated regions are produced in this invention I shall once more consider FIGURE 3. For sufficiently small values of $x$, the output voltage follows line AB and only branch 1 which includes diode 7 and resistor 4 conducts current. At a value of $x$ corresponding to point B, the output voltage is equal to $e_2$. If $x$ is still further increased the output voltage becomes larger than the voltage $e_2$ at terminal 2 and therefore diode 8 begins to conduct. Increasing $x$ still further point F is reached where the output voltage is equal to $e_1$. For $x$ still larger, the output voltage falls below $e_1$ and therefore diode 7 ceases to conduct beyond point F. It has thus been shown that BEF corresponds to simultaneous conduction of two input branches, such a state always existing for values of $x$ which correspond to the region between points B and F, FIGURE 3. Moreover, with our assumption of linear interpolating resistors the output voltage must be a linear function of voltages $e_1$ and $e_2$ in the interpolated region BEF. But $e_1$ and $e_2$ are both assumed to be linear functions of $x$, in this example, and therefore the output voltage is also a linear function of $x$ in the interpolated region. The output voltage is therefore represented by a straight line passing through points B and F as shown in FIGURE 3.

If there are no resistors in the branches of such a function generator no interpolated regions will be produced. If there are resistors in said branches but the common output connection is held at a fixed potential, such as a virtual ground potential, again no interpolated regions are produced. Again, if too much current is allowed to flow out of the output connection, i.e., if too heavy a load is connected to said connection, the function generator may not properly produce the interpolated regions. In many applications it is therefore advantageous substantially to prevent current flow out of said output connection and into the load with the aid of an isolating stage, such as an impedance converter, an emitter follower or a cathode follower, connected to said common connection and substantially reproducing the output signal at a lower impedance level.

The term "linear resistor" as used above describes a resistor whose resistance is independent of the current flowing through it. Interpolating resistors need not be linear resistors. Thus, for example, if resistors 4, 5, 6 in FIGURE 1 are replaced by nonlinear resistors, the input/output characteristic of the function generator will be different from what it is when said resistors are linear. In particular, if the resistance of said resistors is a nonincreasing function of current, the curves representing the interpolated regions will be as shown by curves BDF and GHK in FIGURE 3, which corresponds to a function generator in which said resistance values increase with decreasing current. Since the current through each of the interpolating resistors is smaller than the current $i$ of current means 10 when two or more branches conduct simultaneously, the resistance is increased and the voltage rise is also increased, as compared with the case having linear resistance. Curves BDF and GHK are therefore situated above lines REF and GJK, respectively.

The use of curved characteristics as described above is frequently advantageous because it permits a better approximation to many given functions which are to be produced. Moreover, it is quite possible so to design a function generator of this invention that no linear regions of operation occur in the input/output characteristic.

For example, if operation of a function generator is restricted to one interpolated region, such as BDF, FIGURE 3, nonlinear interpolating resistors being used, then operation is nowhere linear. In this particular instance only two input branches are required, i.e., the branch connected to terminal 3 in FIGURE 1 is omitted, and diodes 7 and 8 are likewise not required in this instance because in said interpolated region both these diodes are conductive at all times except at points B and F. But at B and F one of the branches is not conductive even if it contains no diode, because at these points one of the branches has equal values of potential at its input and output terminals.

The curve BDF is tangential to AB and FG at B and F, respectively, if suitable nonlinear interpolating resistors are used. But AB and FG are parallel to input lines PS and SQ, respectively, i.e the voltages representing the tangents to BDF at its end points are equal to input voltages $e_1$ and $e_2$, except for constant offset voltages, $ir_1$ and $ir_2$, respectively. In this sense it can be stated that a nonlinear interpolated output voltage can be produced from input voltages corresponding to the tangents to the curve representing said output voltage at the end points of the interpolated region.

Further, the curve corresponding to an interpolated output voltage is, in general, quite different from the input/output characteristic curves of the interpolating resistors through whose interaction in the function generator said voltage has been produced, or from the curves representing characteristics of a series or a parallel combination of said interpolating resistors.

Another example of a function generator of this invention is represented in FIGURE 1, having three input branches, and operating throughout nonlinearly. For this purpose voltage $e_3$ is replaced by voltage $e_3'$, FIGURE 3, whose representation passes through the intersection of $e_1$ and CFG, at point F. The range of operation of the function generator, in order to avoid linear regions, does then extend from states in which diodes 7 and 8 conduct simultaneously to states in which diodes 8 and 9 conduct simultaneously. Diode 8 can be omitted in such an embodiment of the invention, because the branch connected to terminal 2 is conductive at all times within the region of nonlinear operation, but diodes 7 and 9 cannot be omitted.

Figure 2:
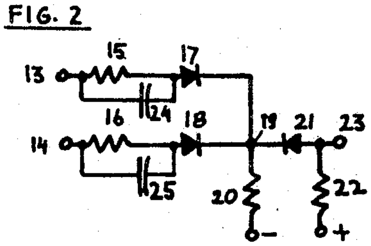
FIGURE 2 is a schematic diagram of a function generator for the production of concave functions.

While the examples which have been described in connection with FIGURE 1 produce output functions which are represented by convex curves i.e. curves whose slope is a nonincreasing function of the variable $x$, the invention is by no means restricted to convex functions. Thus, for example, the function generator whose schematic diagram is represented in FIGURE 2 similarly produces a concave function. 13 and 14 are input terminals adopted to receive first and second input signals. In general $n \geqq 2$ such input terminals would be provided. Series combinations of resistor 15 and diode 17 and of resistor 16 and diode 18 are connected to terminals 13 and 14 and constitute first and second input branches, respectively. These branches have a common output connection at terminal 19 from which positive current is withdrawn through resistor 20 which is connected to negative constant potential means at −. A more general function generator has $n \geqq 2$ such branches. Said resistor and potential means are the current means in this example, supplying a negative current to the common terminal of the two input branches. The required output signal is produced at terminal 19 and the manner of its production will be quite clear from the above description.

24 and 25 are capacitors which improve the frequency response of the function generator. In particular, in embodiments of the invention that use linear interpolating resistors a considerable improvement in the bandwidth can be obtained by the use of capacitors, in parallel with the interpolating resistors. Similarly, capacitors can be used in embodiments corresponding to FIGURE 1.

FIGURE 2 also illustrates one way of compensating for diode drift. For this purpose diode 21 is connected to terminal 19, the output signal being now produced at the other electrode of said diode, at terminal 23, into which current is injected through resistor 22 which is connected to constant potential means, at +. Resistors 20 and 22 are so adapted as to cause diode 21 to be conductive at all times. One way of achieving this is to have in resistor 20 a resistance which is about half the resistance of resistor 22. Any signal path from an input terminal to output terminal 23 now traverses one diode pointing in the forward direction and one diode pointing in the backward direction, and the effects of diode drift and diode offset voltages are thereby cancelled provided that diode 21 is of a type similar to that of diodes 17 and 18. This method of drift compensation is quite generally applicable in all function generators of this invention that comprise unilaterally conductive elements in their interpolating means. In any such case an equal number of forward and backward pointing diodes or similar unilateral elements is provided in each signal path from any input terminal to the output terminal of the function generator.

The function generators of this invention possess the "transfer" property which is as follows: An additive voltage, simultaneously applied to all input terminals of function generators of this invention is transferred, in the form of a substantially equal additive voltage, to the output terminal thereof. Thus adding voltage $e$ simultaneously to terminals 1, 2 and 3, FIGURE 1, causes the voltage at output terminal 12 to rise by $e$, provided that current means 10 comprises an ideal current generator and provided that output terminal 12 is not loaded. If said current means is not ideal, or if some load is connected to said output terminal, said additive voltage is not transferred through the function generator in a precise fashion. For example, if a constant load is connected to terminal 12, FIGURE 1, said load not being too heavy, $e$ is somewhat attenuated in passing through the circuit, so that application of $e$ simultaneously at all input terminal raises the voltage of output terminal 12 by a voltage substantially equal to $k \cdot e$, where $k$ is a factor which is slightly less than unity. Similarly, in the function generator corresponding to FIGURE 2, in which the current means is not ideal, it being comprised of linear resistor 20 connected to constant potential means, a voltage being transferred is somewhat attenuated.

The transfer property will be demonstrated with the help of FIGURE 3. It follows from the figure that there exists a definite relationship between input voltages $e_1$, $e_2$, $e_3$ and output voltage $e_0$, this relationship being exclusively dependent upon the resistances of the interpolating means and upon the value of current $i$. Now, if $i$ is constant it follows from the construction of curve $e_0$ in FIGURE 3 that the addition of the same constant voltage to $e_1$, $e_2$, $e_3$ simply raises line PSQTR and thereby causes the line representing the output voltage to rise by the same amount, i.e. causing the output voltage to increase by said constant voltage.

Prior art diode selection circuits similarly possess the transfer property. For example, the circuit corresponding to FIGURE 1, but without the interpolating resistors 4, 5, and 6 has the transfer property. On the other hand, prior art function generators using nonlinear resistors do not have this property, because they essentially reproduce the voltage/current characteristic of said nonlinear resistors. Similarly, prior art function generators comprising a plurality of input branches each comprising resistance means in series with a diode, said branches having a common output connection which is maintained at virtual ground potential, do not have this property. This fact is best shown experimentally but it can also be demonstrated as follows: For the sake of simplicity consider such a prior art function generator having only two input branches, A and B. If A and B are fed with voltages such that neither of them conducts any current, the addition of a small voltage $e$ at both input terminals will not cause any change in the current in said branches provided that $e$ is small enough so that said branches remain in their nonconductive states. In this instance nothing is thus transferred. Consider next the state in which branch A is conductive and branch B is not conductive. In this instance the produced output voltage is proportional to the input voltage at input terminal of branch A. Denoting this input voltage by $v_A$ the output voltage is equal to $k_A \cdot v_A$ where $k_A$ is a constant of proportionality. The addition of small equal voltages $e$ to the input terminals of branches A and B now causes the output voltage to increase by $k_A \cdot e$. Next, in the case in which both input branches are conductive, the output voltage corresponds to $k_A \cdot v_A + k_B \cdot v_B$, where $v_B$ is the voltage accepted by branch B and $k_B$ is a constant. Addition of the small voltage $e$ simultaneously to both branches produces a change in output voltage of value $k_A \cdot e + k_B \cdot e$. It follows that adding equal voltages simultaneously to all input signals of said prior art function generator produces an effect on the output voltage which depends upon the instantaneous state of the function generator, being given, in the above illustrative example, by O, $k_A \cdot e$, and $$k_A \cdot e + k_B \cdot e$$

when the circuit is in one of three states, respectively, whereas function generators having the transfer property transfer such an additive voltage irrespective of the state of the function generator, producing at any given instant and additive output voltage which is substantially proportional to an additive voltage simultaneously applied at all input terminals of the function generator.

A preferred embodiment of a squarer according to this invention will be described in connection with FIGURE 4. In this example only two input branches are used, this being the simplest configuration. If greater accuracy is required more than two input branches are needed. The squarer of FIGURE 4 produces an output voltage $e_o$ at terminal 45, given by $$e_o = (1/40)x^2 \text{ volts}$$

when voltage $x$ is between 0 and 20 volts, input terminal 30 receives a potential equal to $x$ volts and input terminal 31 is maintained at the fixed potential of 10 volts. One input branch comprises nonlinear resistor 32 in series with adjustable linear resistor 34; the other input branch comprises nonlinear resistor 33 in series with adjustable linear resistor 35. No unilaterally conductive elements are required in these branches because the squarer has been so designed that both branches are conductive of current at any instant. The input branches have a common connection at terminal 36 to which a negative constant current is supplied through prior art constant current source comprising components 37 through 41. The base connection of NPN transistor 39 is held at the constant potential of −0.9 volt with the aid of 5.1 volt Zener diode 37 connected in series with resistor 38 and fed from a voltage source of −6 volts. The current withdrawn from terminal 36 by transistor 39 depends upon the resistance of the series combination of resistors 40 and 41. It is adjustable with the help of the adjustable resistor 41. 42 is a PNP transistor connected as an emitter follower which converts the signal at terminal 36 into a similar signal at output terminal 45. Except for a small offset voltage, the voltages at terminals 36 and 45 are equal at all times. The object of said emitter follower is to provide the output signal at a low impedence level without substantially loading terminal 36. The current withdrawn by transistor 42 from terminal 36 is negligible even when considerable current is withdrawn from terminal 45.

Resistor 40 is, in this example, a negative temperature coefficient (N.T.C.) resistor which compensates for drift in the circuit due to temperature changes. The main source of drift are the nonlinear resistors 32 and 33 whose resistance decreases with increasing temperature, thus causing terminal 45 to be more positive, provided that the current supplied to terminal 36 is independent of temperature. In order to compensate for this temperature dependence of the output voltage, means is provided to cause the current which is withdrawn from terminal 36 to increase with temperature, because increased current lowers the output voltage. Now, a decrease in resistance of N.T.C. resistor 40 causes an increase in current in transistor 39. A suitable choice of resistor 40 thus allows automatic compensation of output drift due to temperature changes.

The adjustment of the function generator of FIGURE 4 proceeds as follows:

Adjust resistor 41 for 0.9 milliamp., approximately, in transistor 39. Next, (1) With $x=0$, adjust resistor 35 for $e_o=0$.

(2) With $x=20$ volts, adjust resistor 34 for $e_o=10$ volts.

(3) With $x=10$ volts, adjust resistor 41 for $e_o=2.5$ volts.

Repeat Steps 1, 2, 3 above, in succession until the process converges.

Figures 4, 5:
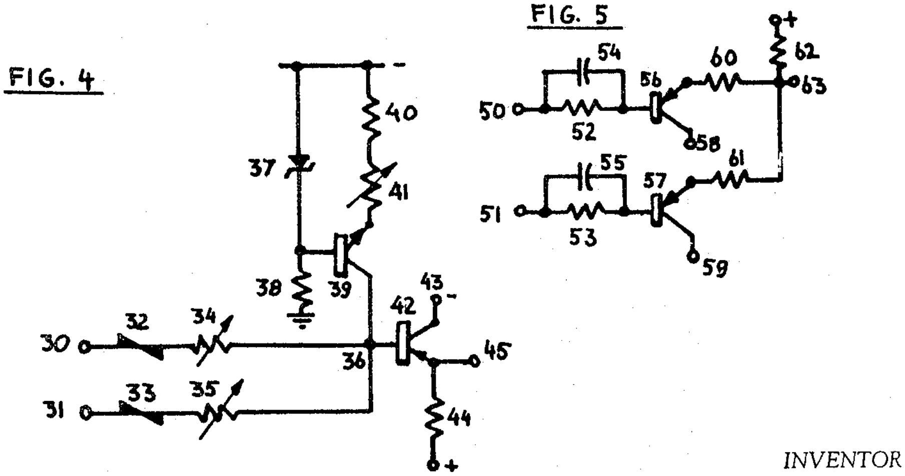
FIGURE 4 is a schematic diagram of one embodiment of a squarer.
FIGURE 5 is a schematic diagram of a transistor embodiment of the invention.

In one emobdiment of a function generator corresponding to FIGURE 4 the following components are used:

Nonlinear resistors 32 and 33 having a characteristic given by $V=60.I^{0.33}$ where V is the voltage drop in volts and I is the current in amperes.

| | |
|---|---|
| Resistors **34** and **35** | 2 kilohms, maximum. |
| Resistor **41** | 5.5 kilohms, maximum. |
| N.T.C. resistor **40** | 1.5 kilohms, in parallel with a linear resistor of 1.2 kilohms. |
| Resistor **38** | 220 ohms. |
| Resistor **44** | 10 kilohms. |
| Zener diode **37** | 5.1 volts. |
| Transistor **39** | Type 2N388. |
| Transistor **42** | Type 2N655. |

It will now be explained why the input voltages to the squarer have been taken as 10 and $x$ volts, respectively. The operation of this squarer is wholly in the interpolated region, when $x$ is between 0 and 20 volts. The tangent corresponding to the curve representing $e_0$ as given above, responds to $$e_t=(1/40)(2xX-X^2)$$

where X is the value of $x$ at the point of tangency. It was already noted in connection with FIGURE 3 that the input voltages to the function generator should correspond to the tangents at the endpoints of the region of operation, when operation is wholly in a non-linear interpolated region. The end points correspond in this instance to $x=0$ volts and to $x=20$ volts, respectively. These two voltages thus determine the points of tangency of the two tangents which correspond to the required input voltages. Introducing into the expression for $e_t$ the values $X=0$ and $X=20$ we obtain $e_t=0$ and $$e_t=x-10 \text{ volts}$$

respectively.

In the example of FIGURE 4 negative current is supplied to terminal 36 resulting in a voltage drop in the interpolating resistors, whereas FIGURE 3 corresponds to a situation in which positive current is supplied. In order to eliminate a constant additive potential at output terminal 45, 10 volts are added to the two expressions corresponding to $e_t$ at $X=0$ and $X=20$, respectively, resulting in input voltages $e_1=10$ volts and $e_2=x$ volts. $e_1$ is supplied to terminal 31 and $e_2$ is supplied to terminal 30.

Differentiating the expression for $e_0$ twice with respect to $x$ the constant $+(1/20)$ is obtained, which is positive and shows that the slope of the curve representing $e_0$ increases with increasing $x$, and $e_0$ thus corresponds to a concave function. For this reason negative current must be supplied to the common junction of the input branches, whereas a convex function requires the supply of positive current to the common junction of the input branches, as in the example of FIGURE 1.

The operation of the circuit of FIGURE 4 has been described in connection with its use as a half squarer, i.e., a squarer operative for non-negative values of variable $x$. The same circuit can operate as a full squarer if only another set of input voltages is supplied to it. While the explanation of the circuit of FIGURE 4 as a full squarer could proceed as above, it is simpler to furnish an explanation in terms of the half squarer, bearing in mind the transfer property of the circuit.

The circuit of FIGURE 4 is productive of the output voltage $e_0$, where $$e_0=(1/10)x^2-7.5 \text{ volts}$$

provided that the input voltages at terminals 30 and 31 are equal to $x$ and $-x$ volts, respectively.

We can evidently write for $x$, $$x=(2x+10)-(x+10)$$

and for $-x$, $$-x=10-(x+10)$$

Voltages $(2x+10)$ and 10 volts, applied at the input terminals of the half squarer, are productive of an output voltage equal to $(1/40)(2x+10)^2$, just voltages $x$ and 10 volts are productive of the voltage $(1/40)x^2$. The voltage $-(x+10)$ volts is simultaneously applied to both input terminals and is thereby transferred through the squarer. The total output voltage at terminal 45 is therefore equal to $$(1/40)(2x+10)^2-(x+10)=(1/10)x^2-7.5 \text{ volts}$$

The allowed range of values for $2x+10$ is now 0 to 20 volts, just as the allowed range of $x$ in the half squarer. But $2x+10=0$ corresponds to $x=-5$ and $2x+10=+20$ corresponds to $x=+5$ volts, and the range of $x$ is therefore from $-5$ to $+5$ volts. The device has thus been shown to be operative as a full squarer. It must, however, be noted, that, while the circuit configuration and the values of all resistive components excepting resistor 38 are identical in said half and said full squarer, the values of voltages at + and − must be readjusted so that the current source and the emitter follower can operate properly in the new voltage range of terminal 36 to which they are connected. In the half squarer the range of voltages at terminal 36 is 0 to 10 volts, approximately, while in said full squarer it is from $-7.5$ to $-5$ volts, approximately.

Another full squarer is obtained if the input voltages are equal to $x+7.5$ and $-x+7.5$ volts, respectively. The output voltage which is produced in such a squarer with the configuration and circuit values corresponding to FIGURE 4 is evidently equal to $(1/10)x^2$ volts, i.e. 7.5 volts more than in the full squarer operative with $x$ and $-x$ as input voltages, because the voltage $+7.5$ volts is additively applied to both input terminals simultaneously.

If the current source in the device of FIGURE 4 is replaced by a similar current source supplying positive current to terminal 36, the device is an implementation of a squarer productive of output voltage $$e_0=-(1/10)x^2+7.5 \text{ volts}$$

from input voltages $x$ and $-x$ at terminals 30 and 31, respectively, within the $x-$ range from $-5$ to $+5$ volts. Current supplied to terminal 36 must be positive because the function $-(1/10)x^2+7.5$ has a negative second derivative with respect to $x$ and is therefore convex. $x$ and $-x$ correspond to the tangents to this function at $X=-5$ volts and $X=+5$ volts, respectively, where $x=X$ is the point of tangency. A current source supplying positive current is well-known in the prior art. One example is similar to the current source of FIGURE 4, the main difference being in the replacement of NPN transistor 39 by a PNP transistor.

It will be quite clear from the above description how the circuit of FIGURE 4 can be adapted to produce any square function within any given range of values.

Function generators of this invention are by no means restricted to the production of functions of a single variable. Nor are they restricted to the production of wholly convex or wholly concave functions, as will now be shown in an example.

It will be shown that the generator of FIGURE 4 operates as a multiplier provided that terminals 30 and 31 are adapted to receive input voltages $$e_1=(1/10)(x-y)/(2)^2+7.5+(x+y)/(2) \text{ volts}$$

and $$e_2=-(1/10)(x-y)/(2)^2+7.5-(x+y)/(2) \text{ volts}$$

respectively.

The output voltage produced at terminal 45 is equal to $(1/10)xy$ volts in this instance because the voltage $$-(1/10)(x-y)/(2)^2+7.5 \text{ volts}$$

being equally applied to both terminals 30 and 31 is transferred to terminal 45, whereas voltages $(x+y)/2$ and $-(x+y)/2$ produce at terminal 45 the voltage $$(1/10)(x+y)/(2)^2-7.5 \text{ volts}$$

just as $x$ and $-x$ produce the voltage $-(1/10)x^2-7.5$ volts. The total voltage produced at terminal 45 is therefore equal to $$-(1/10)(x-y)/(2)^2+7.5 +(1/10)(x+y)/(2)^2-7.5=(1/10)xy \text{ volts}$$

as required in a multiplier.

The above voltages $e_1$ and $e_2$ can also be produced in function generators of this invention. For example, $e_1$ can be produced in a circuit similar to that of FIGURE 4, except that positive current is supplied to terminal 36. Terminals 30 and 31 are adapted to receive the voltages $$e_{11}=(x-y)/2+(x+y)/2=x$$

and $$e_{12}=-(x-y)/2+(x+y)/2=y$$

respectively. Voltage $(x+y)/2$ is thus transferred and voltage $$-(1/10)(x-y)/(2)^2+7.5 \text{ volts}$$

is produced from $(x-y)/2$ and $-(x-y)/2$, just as voltage $-(1/10)x^2+7.5$ volts is produced in such a circuit from $x$ and $-x$ as input voltages.

Voltages $e_2$ can similarly be produced in a circuit similar to FIGURE 4 with supply of positive current to terminal 36, if terminals 30 and 31 are adapted to receive the voltages $$e_{21}=(x-y)/2-(x+y)/2=-y$$

and $$e_{22}=-(x-y)/2-(x+y)/2=-x$$

respectively.

Voltage $-(x+y)/2$ is transferred in this case and the additional voltage $$-(1/10)(x-y)/(2)^2+7.5 \text{ volts}$$

is produced from $(x-y)/2$ and $-(x-y)/2$ resulting in a total voltage equal to $e_2$ at terminal 45.

Another way of producing $e_2$ is the addition of $(x+y)$ volts to $e_1$, in view of the relation $e_2=e_1+(x+y)$, which holds in this example.

Still another way of producing $e_2$ is through use of the unmodified function generator corresponding to FIGURE 4, its input voltages being adapted to produce an output voltage corresponding to $-e_2$, sign changing means receiving the voltage $-e_2$ and producing therefrom the voltage $e_2$. In order to produce voltage $-e_2$ at terminal 45, terminals 30 and 31 are adapted to receive the voltages $$e_{21}'=(x-y)/2+(x+y)/2=x$$

and $$e_{22}'=-(x-y)/2+(x+y)/2=y$$

respectively. Voltage $(x+y)/2$ is thereby transferred and in addition voltage $(1/10)((x-y)/2)^2-7.5$ volts is produced at terminal 45, so that the voltage of terminal 45 is equal to $-e_2$, as required.

An analogous embodiment of a multiplier uses a function generator of this invention, transferring the voltage $(1/10)[(x+y)/2]^2-$ and simultaneously producing the voltage $-(1/10)[(x-y)/2]^2$ from $e_1'$ and $e_2'$ where $$e_1'=(1/10)[(x+y)/2]^2-7.5+(x-y)/2$$

$$e_2'=(1/10)[(x+y)/2]^2-7.5-(x-y)/2$$

$e_1'$ can be produced in this invention from $e_{11}'$ and $e_{12}'$ where $$e_{11}'=(x+y)/2+(x-y)/2=x$$

$$e_{12}'=-(x+y)/2+(x-y)/2=-y$$

and $e_2'$ can be produced in function generators of this invention from $e_{21}'$ and $e_{22}'$, where $$e_{21}'=(x+y)/2-(x-y)/2=y$$

$$e_{22}'=-(x+y)/2-(x-y)/2=-x$$

and the manner of such embodiments of function generators and their operation will be quite clear from the above description of this invention.

Moreover, it is similarly possible to produce the voltage $-(1/10)xy$ in a function generator of this invention. For this purpose any one of the two above multiplier embodiments can be used as may be shown by substituting for $-y$ the variable $y'$, which is thus equal to the negative of $y$. The multiplier is thus productive of the voltage $-(1/10)xy'$. The input voltages are likewise calculated by substituting $y'$ for $-y$ and $-y'$ for $y$ in the respective expressions.

Even if one of the non-linear resistances in FIGURE 4 is replaced by a linear resistance, the circuit produces a nonlinear function which is of interest in some applications.

Another embodiment of the invention will be described in connection with FIGURES 1, 6 and 7. The device corresponding to FIGURE 1 can be adapted to produce a square function $e_0'=-(1/44)x^2$, for example, under the following conditions: $e_1$, $e_2$, $e_3$ at input terminals 1, 2, 3, respectively, are given by $e_1=-0.92x+8.05$ volts
$e_2=-1.15$ volts
$e_3=0.92x+8.05$ volts Resistance of branches 4, 5, 6, each, $r=1.84$ kilohms. Current $i=0.625$ ma., approximately, this current being produced by connecting a resistor of 160 kilohm resistance between terminal 11 and constant potential means of 100 volts.

The produced output voltage is plotted in FIGURE 7, where it corresponds to curve $e_0'$. The accurate parabolic curve is also plotted in the figure. It is denoted by $y$. It is seen that $e_0'$ provides an approximation to $y$, within a suitable range of values of $x$ which is, in this example, from $-25$ to $+25$ volts.

FIGURE 6 is a schematic diagram of an embodiment of the invention which corresponds to the above example. The voltage which is produced at terminals 89 is likewise equal to $e_0'$ as plotted in FIGURE 7 and as described above. In fact, the circuit of FIGURE 1 is equivalent to the circuit in FIGURE 6 taken up to terminal 89, provided that suitable resistance values and suitable input voltages are used. In FIGURE 6, the input voltages at input terminals 70, 71, 72, 73, 74, 75 are, in volts, $-x$, 100, $-100$, 0 $x$, 100, respectively. Interpolating resistors 76, 77, 78, 79, 80, 81, have the following values in kilohms: 2.0, 12.4, 160, 1.86, 2.0, 12.4, respectively. Resistor 88 is 160 kilohms and the voltage at + is 100 volts. The input resistance values are so chosen that the parallel connections of resistors 76, 77; 78, 79; 80, 81 have a resistance of 1.84 kilohms each, this, again, being the value of the interpolating resistance in this instance. Further, the voltages produced at terminals 82, 83, 84 are equal to $e_1$, $e_2$, $e_3$, respectively, as in the preceding example, provided that no load is connected to said terminals. It follows that the input circuits described in connection with FIGURES 1 and 6 are fully equivalent as far as the present circuits are concerned. The voltage at terminal 89 is multiplied by a negative constant in a conventional sign-changing adder, comprising input resistor 90 and feedback resistor 92, amplifier 95 having a large amplification A, and output terminal 96. The resistance of resistor 90 must be large with respect to the interpolating resistance $r$ in order not to impair the operation of the circuit. In one example it was of the order of 500 kilohms. Resistor 93 which connects terminal 94 to the input terminal 91 of operation amplifier 95 permits the addition to the output voltage at 96 of a constant voltage. The output voltage $e_0$ at terminal 96 is therefore equal to $Cx^2+D$, where C and D are constants.

In order to transfer an additive signal from the input terminals to terminal 89, FIGURE 6, it is necessary to add said additive signal simultaneously at all input terminals, including terminal 73 which is normally at ground potential. The additive signal thus applied will be transferred to terminal 89, suffering just a very slight attenuation, of the order of 1%; its contribution to the output voltage $e_0$ at terminal 96 will therefore be proportional to the negative of said additive signal.

A further example of carrying out of the invention will be described in connection with FIGURE 5 in which unilaterally conductive elements are used in the form of transistor means. 50 and 51 are the input terminals 52 and 53 in parallel with capacitors 54 and 55, respectively, are standard input circuits to the base connections of PNP transistors 56 and 57, respectively, while 60 and 61 are interpolating resistors, connected between the emitters of said transistors and the common output connection at terminal 63 which is connected through resistor 62 to a positive potential. Collector terminals 58 and 59 are at suitable constant potentials. The operation of this circuit is quite analogous to that of circuits using diodes as unilateral elements, the main difference being the input impedance to the circuit.

A similar circuit uses a plurality of NPN transistors, a plurality of interpolating means connected to their emitters having a common output connection which is supplied with negative current. Such a circuit can, for example, produce concave functions of one variable, while the circuit of FIGURE 5 can be adapted to produce convex functions of one variable.

A further example of the invention will be described in connection with FIGURE 8 which is a scrap circuit diagram of a squarer having three input terminals 30, 31, 30' and associated interpolating branches. The circuit of FIGURE 8 can replace the input circuit of the squarer of FIGURE 4 thereby transforming it into a full squarer producing at terminal 45 the output voltage $e_0=(1/40)x^2$ between −20 and +20 volts. The branches connecting input terminals 30 and 31 with terminal 36 are similar in both figures, except that diodes 100 and 101 are included in the example of FIGURE 8. In FIGURE 8, the additional input terminal 30' is fed by voltage $-x$. Nonlinear resistor 99 and diode 102 connect terminals 30' and 36. For non-negatixe $x$ only diodes 100 and 101 are conductive and diode 102 is not conductive, and the additional input branch does thus not affect the circuit. For negative $x$ diode 100 ceases to conduct and diodes 101 and 102 conduct simultaneously. But then $-x$ is positive and therefore the output voltage is insensitive to the sign of $x$ and the circuit functions as a full squarer. Diode 101 is optional.

Another full squarer is shown schematically in FIGURE 9. Input terminals 104 and 105 receive potentials $x$ and $-x$, respectively. Diodes 106, 107 are connected to said terminals, respectively, and have a common cathode connection at terminal 30 from which positive current is withdrawn through a resistor connected to negative potential means at —. The voltage at (30) thus corresponds to the larger of $x$ and $-x$, i.e., it corresponds to $|x|$. A half squarer, such as that of FIGURE 4, can therefore be fed from terminal 30. The combined circuit of FIGURES 4 and 9 possesses the transfer property.

Although this invention has been described and illustrated in detail, it is to be clearly understood that the same is by way of illustration and example only and is not to be taken by way of limitation, the scope of this invention being limited only by the terms of the appended claims.

What I claim is:

1. An electronic function generator for generating a function of at least one variable, including a plurality of input means for accepting a plurality of input signals, at least one of said signals being a function of said variable; a point of common output connection; a plurality of interpolating conductive means, each of said interpolating means being connected at one end to a corresponding one of said input means, and all of said interpolating means being connected at their other ends to said point of common output connection, at least one of said interpolating means having a nonlinear resistive characteristic; current means connected to said point of common output connection for supplying current to at least one of said interpolating means at any instant, the resistive values of said interpolating means being arranged to cause at least two of said interpolating means to conduct simultaneously for predetermined values of said input signals; and circuit means having an input terminal and an output terminal, said input terminal presenting high input impedance, said input terminal being connected to receive an electrical signal from said point of common output connection, said circuit means producing at said output terminal an output signal substantially linearly dependent upon said electrical signal, said circuit means causing the total amount of current flowing through said point of common output connection into said interpolating means to be substantially physically uninfluenced by the values of said input signals.

2. The device as recited in claim 1, being adapted substantially to transfer to said point of common output connection an additive input signal if simultaneously added to all said input signals.

3. The device as recited in claim 2, said current means being adapted to supply a current which is substantially physically uninfluenced by the potential of said point of common output connection.

4. A squarer comprising the device as recited in claim 2 wherein all said interpolating means have substantially identical voltage/current characteristics, said produced function corresponding to a quadratic function of said variable.

5. The device as recited in claim 4 wherein said variables are composed of first and second variables comprising means for introducing to said input means said plural input signals in the form of substantially linear functions of said variables thereof, adapted to produce said output signal corresponding with a linear function of the square of the difference of said first and second variables and the sum of said first and second variables.

6. The device as recited in claim 4 wherein said variables are composed of first and second variables comprising means for introducing to said input means said plural input signals in the form of substantially linear functions of said variables, adapted to produce an output signal corresponding with a linear function of the square of the sum of said first and second variables and the difference of said first and second variables.

7. The device as recited in claim 1, said current means comprising means responsive to temperature for the compensation of temperature drift in said function generator.

8. The device as recited in claim 1, wherein said interpolating means are composed of a plurality of branches each connecting a respective one of said input means to said pair of common output connection.

9. The device as recited in claim 8, wherein said branches are composed of first and second bilaterally conductive nonlinear resistance means connecting first and second input means to said point of common output connection.

10. The device as recited in claim 8, said branches comprising at least one series combination of bilaterally conductive nonlinear resistance means and unilaterally conductive means connected to said point of common output connection.

11. The device as recited in claim 8, said current means being adapted to supply a current which is substantially physically uninfluenced by the potential of said point of common output connection.

12. The device as recited in claim 8 being adapted substantially to transfer to said point of common output connection an additive input signal if simultaneously added to all said input signals.

13. A half squarer for producing a function corresponding with the square of a variable for a range of values of said variable comprising the device as recited in claim 1 wherein said plural input means are composed of first and second input means, said input signals are composed of a first signal representing said variable and a second signal the magnitude whereof is substantially constant, means for supplying said constant signal to said second input means, and wherein the resistive characteristics of said interpolating means connecting said first and second input means with said point of common output connection are substantially identical.

14. A squarer for producing a function corresponding with the square of a variable for positive and negative values thereof comprising the device as recited in claim 1 wherein said plural input means comprise first input means for receiving a first of said input signals representing said variable, second input means for receiving a second of said input signals representing the negative of said variable, being adapted substantially to transfer to said point of common output connection an additive input signal if simultaneously added to all said input signals.

15. In a multiplier, the device as recited in claim 14 comprising means for introducing said first and said additive input signals to said input means, wherein said first input signals are substantially linear functions of the sum of first and second multiplicands and the modulus of said additive input signal corresponds with the square of the difference of said multiplicands adapted to produce at said point of common output connection from said first input signals a primary output signal whose modulus corresponds with the square of the sum of said multiplicands simultaneously to transfer thereto said additive input signal, said multiplier being adapted to produce opposite signs for said primary and additive signals such that said output signal represents the product of said multiplicands.

16. In a multiplier, the device as recited in claim 14 comprising means for introducing said first and said additive input signals to said input means, wherein said first input signals are substantially linear functions of the difference of first and second multiplicands and the modulus of said additive input signal corresponding with the square of the sum of said multiplicands being adapted to produce at said point of common output connection from said first input signals a primary output signal whose modulus corresponds with the square of the difference of said multiplicands simultaneously to transfer thereto said additive input signal, said multiplier being adapted to produce opposite signs for said primary and said additive signals such that said output signal represents the product of said multiplicands.

17. An electronic function generator for generating a function of at least one variable, including a plurality of input means for accepting a plurality of input signals at least one of said signals being a function of said variable; a point of comomn output connection for producing thereat an output signal; a plurality of interpolating conductive means each of said interpolating means being connected to a corresponding one of said input means and to said point of common output connection, wherein each of said plural interpolating means is composed of linear resistance means and unilaterally conductive means; current means connected to said point of common output connection for supplying current to at least one of said unilaterally conductive means at any given instant; the resistive values of said interpolating means being arranged to cause at least two of said unilaterally conductive means to conduct simultaneously for predetermined values of said input signals; said current means including means for causing any variation in the total magnitude of current flowing through said point of common output connection into said plural interpolating means divided by its maximum magnitude to be substantially smaller than any variation in the magnitude of the potential of said point of common output connection divided by its maximum magnitude, where the potential of said point of common output connection is referred to ground potential, causing said function generator to produce at said point of common output connection an output signal which is a substantially linear function of said input signals when only one of said unilaterally conductive means is conducting at any given instant and is a different substantially linear function of said input signals when two of said unilaterally conductive means are conducting simultaneously such that said output signal corresponds to any one of a plurality of substantially linear functions of said input signals, greater in number than said unilaterally conductive means, for predetermined values of said input signals.

18. The function generator as recited in claim 17, being adapted substantially to transfer to said point of common output connection an additive input signal if simultaneously added to all said input signals.

19. The device as recited in claim 18, wherein said current means is adapted to supply a current which is substantially physically uninfluenced by the values of said input signals.

20. A squarer comprising the device as recited in claim 18 wherein all said interpolating means have substantially equal resistance between said said point of common output connection and said input means while said unilateral means are conductive and said input means are short circuited, said produced function corresponding to a quadratic function of said variables.

21. The device as recited in claim 18 wherein said variables are composed of first and second variables comprising means for introducing to said input means said plural input signals in the form of substantially linear functions of said variables, adapted to produce an output signal corresponding with a linear function of the square of the difference of said first and second variables and the sum of said first and second variables.

22. The device as recited in claim 18 wherein said variables are composed of first and second variables comprising means for introducing to said input means said plural input signals in the form of substantially linear functions thereof, adapted to produce said output signal corresponding with a linear function of the square of the sum of said first and second variables and the difference of said first and second variables.

23. The device as recited in claim 17, comprising circuit means having an input terminal and an output terminal, said input terminal presenting high input impedance, said input terminal being connected to receive an electrical signal from said point of common output connection, said circuit means producing at said output terminal a second output signal substantially linearly dependent upon said electrical signal, said circuit means causing the total amount of current flowing through said point of common output connection into said interpolating means to be substantially physically uninfluenced by the values of said input signals.

24. The device as recited in claim 17 including additional unilateral conductive means for the compensation of drift caused in said unilateral means.

25. The device as recited in claim 17 wherein each of said plural interpolating means is composed of a series combination of said linear resistance means and said unilaterally conductive means each combination connecting a respective one of said input means to said point of common output connection.

26. The device as recited in claim 25 said current means being adapted to supply a current which is substantially physically uninfluenced by the potential of said point of common output connection.

27. The device as recited in claim 25 being adapted substantially to transfer to said point of common output connection an additive input signal if simultaneously added to all said input signals.

28. A half squarer for producing a function corresponding with the square of a variable for a range of values thereof comprising the device as recited in claim 17 wherein said input signals include a first signal representing said variable, and wherein the resistive characteristics of said plural interpolating means connecting respective ones of said input means with said point of common output connection are substantially identical.

29. A squarer for producing a function corresponding with the square of a variable for positive and negative values thereof comprising the device as recited in claim 17 wherein said plural input means comprise first input means for receiving a first of said input signals representing said variable, second input means for receiving a second of said input signals representing the negative of said variable, being adapted substantially to transfer to said point of common output connection and additive input signal if simultaneously added to all said input signals.

30. In a multiplier, the device as recited in claim 29 wherein said first input signals are substantially linear functions of the sum of first and second multiplicands and the modulus of said additive input signal corresponds with the square of the difference of said multiplicands, adapted to produce at said point of common output connection from said first input signals a primary output signal whose modulus corresponds with the square of the sum of said multiplicands simultaneously to transfer thereto said additive input signal, said multiplier being adapted to produce opposite signs for said primary and additive signals such that said output signal represents the product of said multiplicands.

31. In a multiplier, the device as recited in claim 29 wherein said first input signals are substantially linear functions of the difference of first and second multiplicands and the modulus of said additive signal corresponds with the square of the sum of said multiplicands, adapted to produce at said point of common output connection from said first input signals a primary output signal whose modulus corresponds with the square of the difference of said multiplicands simultaneously to transfer thereto said additive input signal, said multiplier being adapted to produce opposite signs for said primary and additive signals such that said output signal represents the product of said multiplicands.

References Cited by the Examiner

UNITED STATES PATENTS

| | | | |
|---|---|---|---|
| 2,899,550 | 8/1959 | Meissinger et al. | 235—197 X |
| 3,031,143 | 4/1962 | McCoy et al. | 235—194 |
| 3,106,639 | 10/1963 | Nathan | 235—197 |

MALCOLM A. MORRISON, *Primary Examiner.*

K. W. DOBYNS, *Assistant Examiner.*